$$\dot{A} = \dot{a} \cos \phi - \dot{e} \sin \phi$$
$$\dot{E} = \dot{e} \cos \phi + \dot{a} \sin \phi$$

INVENTORS
RALPH I. HAUSER
DAVID R. HOUSTON $V_{A_1} = \dot{\alpha}$ $V_{A_2} = \dot{\alpha}\ \mathrm{COS}\ \phi$ $V_{A_3} = \dot{\alpha}\ \mathrm{SIN}\ \phi$ $V_{A_4} = [-\dot{\alpha}\ \mathrm{COS}\ \phi + \dot{\beta}\ \mathrm{SIN}\ \phi]$ $V_{A_5} = \int[-\dot{\alpha}\ \mathrm{COS}\ \phi + \dot{\beta}\ \mathrm{SIN}\ \phi]\ dt$ $V_{A_6} = \theta_{A1}$ $V_{A_7} = \theta_{A1} + \int[-\dot{\alpha}\ \mathrm{COS}\ \phi + \dot{\beta}\ \mathrm{SIN}\ \phi]\ dt$ $V_{A_8} = \{\theta_{A1} + \int[-\dot{\alpha}\ \mathrm{COS}\ \phi + \dot{\beta}\ \mathrm{SIN}\ \phi]\ dt\}\ \mathrm{COS}\ \phi$ $V_{A_9} = \{\theta_{A1} + \int[-\dot{\alpha}\ \mathrm{COS}\ \phi + \dot{\beta}\ \mathrm{SIN}\ \phi]\ dt\}\ \mathrm{SIN}\ \phi$ $V_{A_{10}} = \{\theta_{A1} + \int[-\dot{\alpha}\ \mathrm{COS}\ \phi + \dot{\beta}\ \mathrm{SIN}\ \phi]\ dt\}\ \mathrm{COS}\ \phi + \{\theta_{E1} - \int[\dot{\alpha}\ \mathrm{SIN}\ \phi + \dot{\beta}\ \mathrm{COS}\ \phi]\ dt\}\ \mathrm{SIN}\ \phi$ $V_{E_1} = \dot{\beta}$ $V_{E_2} = \dot{\beta}\ \mathrm{SIN}\ \phi$ $V_{E_3} = \dot{\beta}\ \mathrm{COS}\ \phi$ $V_{E_4} = [\dot{\alpha}\ \mathrm{SIN}\ \phi + \dot{\beta}\ \mathrm{COS}\ \phi]$ $V_{E_5} = \int[\dot{\alpha}\ \mathrm{SIN}\ \phi + \dot{\beta}\ \mathrm{COS}\ \phi]\ dt$ $V_{E_6} = \theta_{E1}$ $V_{E_7} = \theta_{E1} - \int[\dot{\alpha}\ \mathrm{SIN}\ \phi + \dot{\beta}\ \mathrm{COS}\ \phi]\ dt$ $V_{E_8} = \{\theta_{E1} - \int[\dot{\alpha}\ \mathrm{SIN}\ \phi + \beta\ \mathrm{COS}\ \phi]\ dt\}\ \mathrm{SIN}\ \phi$ $V_{E_9} = \{\theta_{E1} - \int[\dot{\alpha}\ \mathrm{SIN}\ \phi + \beta\ \mathrm{COS}\ \phi]\ dt\}\ \mathrm{COS}\ \phi$ $V_{E_{10}} = -\{\theta_{A1} + \int[-\dot{\alpha}\ \mathrm{COS}\ \phi + \dot{\beta}\ \mathrm{SIN}\ \phi]\ dt\}\ \mathrm{SIN}\ \phi + \{\theta_{E1} - \int[\dot{\alpha}\ \mathrm{SIN}\ \phi + \dot{\beta}\ \mathrm{COS}\ \phi]\ dt\}\ \mathrm{COS}\ \phi$ $V_{ptc}$ PATTERN-TIME COORDINATE EXPRESSION OF $V_{A_{10}}$ & $V_{E_{10}}$ $V_{cp}$ VOLTAGE PROPORTIONAL TO ELAPSED TIME IN GIVEN SEARCH CYCLE $V_R = \dot{\phi}$

FIG. 3

United States Patent Office 3,182,321

Patented May 4, 1965

3,182,321

SCANNER CO-ORDINATE COMPENSATOR FOR RADAR-BEARING CRAFT

Ralph I. Hauser, Gambrills, and David R. Houston, North Linthicum, Md., assignors, by mesne assignments, to the United States of America as represented by the Secretary of the Navy Filed Apr. 23, 1962, Ser. No. 190,200
11 Claims. (Cl. 343—7.3)

This application is a continuation-in-part of application Serial No. 801,679, filed March 24, 1959, now abandoned, and entitled "Search Pattern Stabilizer."

The present invention relates generally to a scanner co-ordinate compensator and more particularly to a system, which during a tracking operation comprising successive target observations, compensates for the effects of maneuvers of the radar carrying aircraft, hereinafter termed ownship.

The radar scanner of a search-while-track radar system follows a cyclic search pattern during the search-track phase of operation of the system. Targets are tracked during this phase by gating the radar receiver to receive video information each time the radar system scanner is pointed at the predicted position in space of a target. In order to avoid either missing a target observation or misidentifying a target, provisions must be made in the radar system to compensate for ownship motions between successive target observations.

Prior art systems provide the required compensation by altering the motion of the radar scanner during a given search cycle as a function of ownship maneuvers during the search cycle. This method while providing a straight-forward solution to the problem entails several disadvantages, among which are the following:

(1) The angular coverage of the radar scanner is distorted to an extent determined by ownship maneuvers. Studies show that this distortion results in the development of serious and undesirable blind areas.

(2) If the ownship maneuvers are relatively severe (for example during typical ownship evasive action) the required accelerations and velocities often exceed the capabilities of the scanner driving mechanism.

(3) A three-axes positional ownship reference is required to instrument the prior art method. Such a reference is not available in all search-while-track radar systems.

In certain applications wherein it is desired to provide greater than usual scanner angular coverage, the first and second disadvantages mentioned above are aggravated.

The system of the present invention provides a means to vary the time at which the radar receiver is gated as a function of ownship maneuvers between successive target observations. Thus, since the radar scanner pattern is unaltered, the disadvantages inherent in the prior art systems are overcome.

As will be explained more fully below, signals proportional respectively to the target azimuth and elevation co-ordinates at the time of the previous target observation are combined with signals proportional to the apparent change in the target position resulting from ownship maneuvers to provide signals proportional to the instantaneously correct target azimuth and elevation co-ordinates.

While it is possible to directly utilize the corrected target azimuth and elevation co-ordinate signals to gate the radar receiver at the proper time to begin a new target observation, it is convenient to convert the target co-ordinate signals into a signal proportional to a single quantity hereinafter termed a pattern time co-ordinate and to utilize this latter signal to perform the gating function. As will be more fully explained below, the term pattern time co-ordinate refers to the time elapsed in a given search cycle between the initiation thereof and the point in the cycle when the radar scanner is pointed toward the position of the target.

The uncorrected target co-ordinate signals may be obtained from the memory circuits of existing search-while-track radar systems while the present invention provides means to compute error signals proportional to ownship maneuvers and further provides means to combine the uncorrected target co-ordinate signals with the maneuvering error signals and to convert the corrected target co-ordinate signals into a gating signal.

No provision is made to compensate for the effect of target maneuvers since the performance of known search-while-track radar systems is not expected to be adversely effected to any substantial degree by changes in the position of the target. However, if necessary, appropriate devices or mechanisms may be included in the search-while-track radar system to compensate for the changes in the target position which may occur between successive observations.

Accordingly, it is an object of the present invention to compensate the scanner co-ordinate of a radar scanner against ownship motion without altering the scanner motion during the search cycle.

It is another object of the present invention to provide means for use with a search-while-track radar system to vary the time when the radar receiver is gated in accordance with ownship motion.

It is a further object of the present invention to provide means for use with a search-while-track radar system to compute and to combine signals proportional to ownship maneuvers with signals proportional to the co-ordinates of a target at a previous observation.

It is still another object of the present invention to provide means for use with a search-while-track radar system to correct signals proportional to the co-ordinates of a target at a previous observation in accordance with ownship motion and to convert the resulting signals into a radar receiver gating pulse.

Other objects and many of the attendant advantages of this invention will be readily appreciated as the same becomes better understood by reference to the following detailed description when considered in connection with the accompanying drawings wherein:

FIGS. 1*a*, 1*b*, and 1*c* geometrically illustrate pertinent aspects of the ownship maneuvering problem.

FIG. 2 is a block diagram of an illustrative embodiment of the invention.

FIG. 3 in tabular form, identifies the character of the signals produced by various portions of the embodiment of FIG. 2.

Assuming that between successive observations the target has not maneuvered so that any change in the spacial relationship between the target and the ownship results solely from ownship maneuvers, it is obvious that at any instant of time the correct azimuth and elevation co-ordinates of the target with respect to the radar scanner may be expressed as:

(1) $$\theta_A=\theta_{A1}+\Delta\theta_A$$

(2) $$\theta_E=\theta_{E1}+\Delta\theta_E$$

where $\theta_A$=the instantaneously correct target azimuth co-ordinate
$\theta_E$=the instantaneously correct target elevation co-ordinate
$\theta_{A1}$=the target azimuth co-ordinate at the time of the previous observation
$\theta_{E1}$=the target elevation co-ordinate at the time of the previous observation
$\Delta\theta_A$=the target azimuth co-ordinate correction required by ownship maneuvers
$\Delta\theta_E$=the target elevation co-ordinate correction required by ownship maneuvers As will be more fully explained below, Equations 1 and 2 may be rewritten as follows:

(3)
$$\theta_A=\theta_{A1}+\left[-\frac{\theta_{A1}}{\cos\phi}+\theta_{A1}+\int(-\dot\alpha\cos\phi+\dot\beta\sin\phi)\,dt\right]\cos\phi+\theta_{E1}+\left[\frac{\theta_{E1}}{\sin\phi}+\theta_{E1}-\int(\dot\alpha\sin\phi+\dot\beta\cos\phi)\,dt\right]\sin\phi$$

(4)
$$\theta_E=\theta_{A1}-\left[\frac{\theta_{A1}}{\sin\phi}+\theta_{A1}+\int(-\dot\alpha\cos\phi+\dot\beta\sin\phi)\,dt\right]\sin\phi+\theta_{E1}+\left[-\frac{\theta_{E1}}{\cos\phi}+\theta_{E1}-\int(\dot\alpha\sin\phi+\dot\beta\cos\phi)\,dt\right]\cos\phi$$

and re-expressed as:

(5)
$$\theta_A=[\theta_{A1}+\int(-\dot\alpha\cos\phi+\dot\beta\sin\phi)\,dt]\cos\phi+[\theta_{E1}-\int(\dot\alpha\sin\phi+\dot\beta\cos\phi)\,dt]\sin\phi$$

(6)
$$\theta_E=-[\theta_{A1}+\int(-\dot\alpha\cos\phi+\dot\beta\sin\phi)\,dt]\sin\phi+[\theta_{E1}-\int(\dot\alpha\sin\phi+\dot\beta\cos\phi)\,dt]\cos\phi$$

where $\dot\alpha$=the ownship yaw rate between successive target observations
$\dot\beta$=the ownship pitch rate between successive target observations
$\phi$=the ownship roll position with respect to the roll position of the ownship at the previous target observation The manner in which the present invention mechanizes the various operations required in the solution of Equations 5 and 6 will be explained below in connection with the description of an illustrative embodiment of the invention. However, the derivation of Equations 5 and 6 will first be discussed by reference to FIGS. 1*a*, 1*b*, and 1*c*.

Figure 1A:
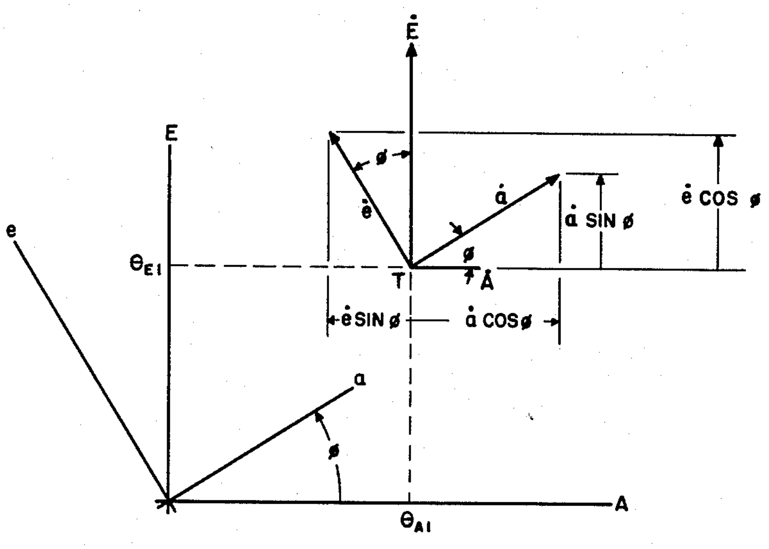

Referring now to FIG. 1*a*, the scanner axes at the time of a previous observation are designated A and E while the co-ordinates of the target T at the time of the previous observation are designated $\theta_{A1}$ and $\theta_{E1}$. Subsequent to a target observation, the scanner axes may be rotated through an angle $\phi$ as the result of ownship roll and the scanner axes may also be rotated in azimuth and elevation at rates $\dot a$ and $\dot e$ due to ownship yaw and pitch. Accordingly, by reference to FIG. 1*a*, it may be seen that the total azimuth and elevation scanner rotation rates $\dot A$ and $\dot E$, taking into account the effect of ownship roll, may be expressed as:

(7) $$\dot A=\dot a\cos\phi-\dot e\sin\phi$$

(8) $$\dot E=\dot e\cos\phi+\dot a\sin\phi$$

The present invention is particularly, though by no means exclusively, useful in tail turret systems. In tail turrent systems:

(9) $$\dot a=-\dot\alpha$$

(10) $$\dot e=-\dot\beta$$

where, as above, $\dot\alpha$=ownship yaw rate between successive target observations, and
$\dot\beta$=ownship pitch rate between successive target observations Equations 7 and 8 may be rewritten in terms of ownship yaw rate and ownship pitch rate by combining Equations 7 through 10.

(11) $$\dot A=-\dot\alpha\cos\phi+\dot\beta\sin\phi$$

(12) $$\dot E=-\dot\beta\cos\phi-\alpha\sin\phi$$

Figures 1B, 1C:
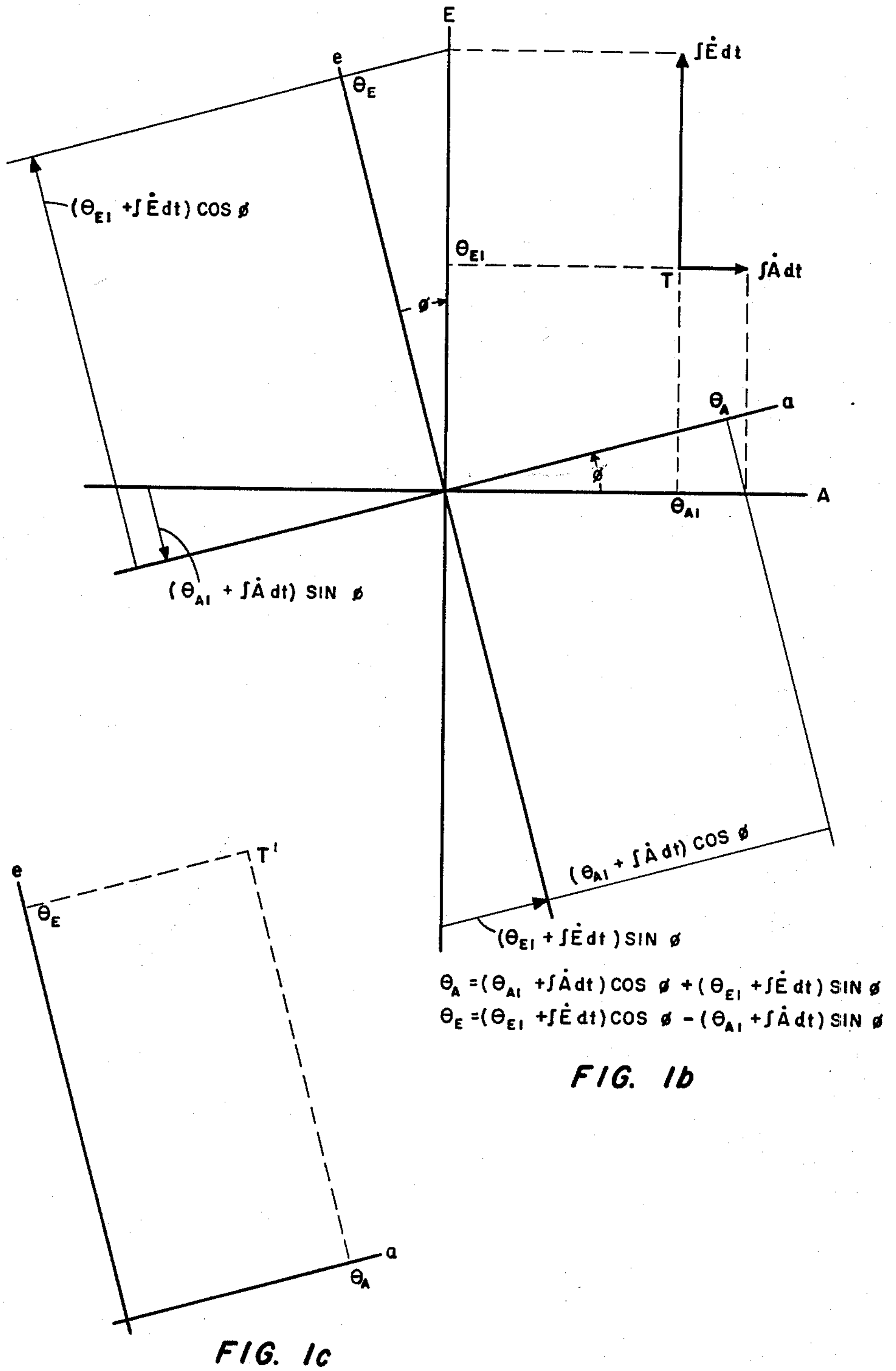

By reference to FIG. 1*b* it may be seen that:

(13) $$\theta_A=(\theta_{A1}+\int\dot A dt)\cos\phi+(\theta_{E1}+\int\dot E dt)\sin\phi$$

(14) $$\theta_E=(\theta_{E1}+\int\dot E dt)\cos\phi-(\theta_{A1}+\int\dot A dt)\sin\phi$$

where $\int\dot A dt$=the integral of the scanner azimuth rotational rate
$\int\dot E dt$=the integral of the scanner elevation rotational rate Substitution of equations 11 and 12 into equations 13 and 14 yields:

(15) $$\theta_A=[\theta_{A1}+\int(-\dot\alpha\cos\phi+\dot\beta\sin\phi)\,dt]\cos\phi+[\theta_{E1}+\int(-\dot\beta\cos\phi-\dot\alpha\sin\phi)dt\sin\phi$$

(16) $$\theta_E=[\theta_{E1}+\int(+\dot\beta\cos\phi-\dot\alpha\sin\phi)\,dt]\cos\phi-[\theta_{A1}+\int(-\alpha\cos\phi+\beta\sin\phi)dt]\sin\phi$$

Upon simplification and rearrangement of terms, Equations 15 and 16 become Equations 5 and 6.

The apparent position of the target taking into account ownship motion is indicated at T′ in FIG. 1*c*.

Figure 2:
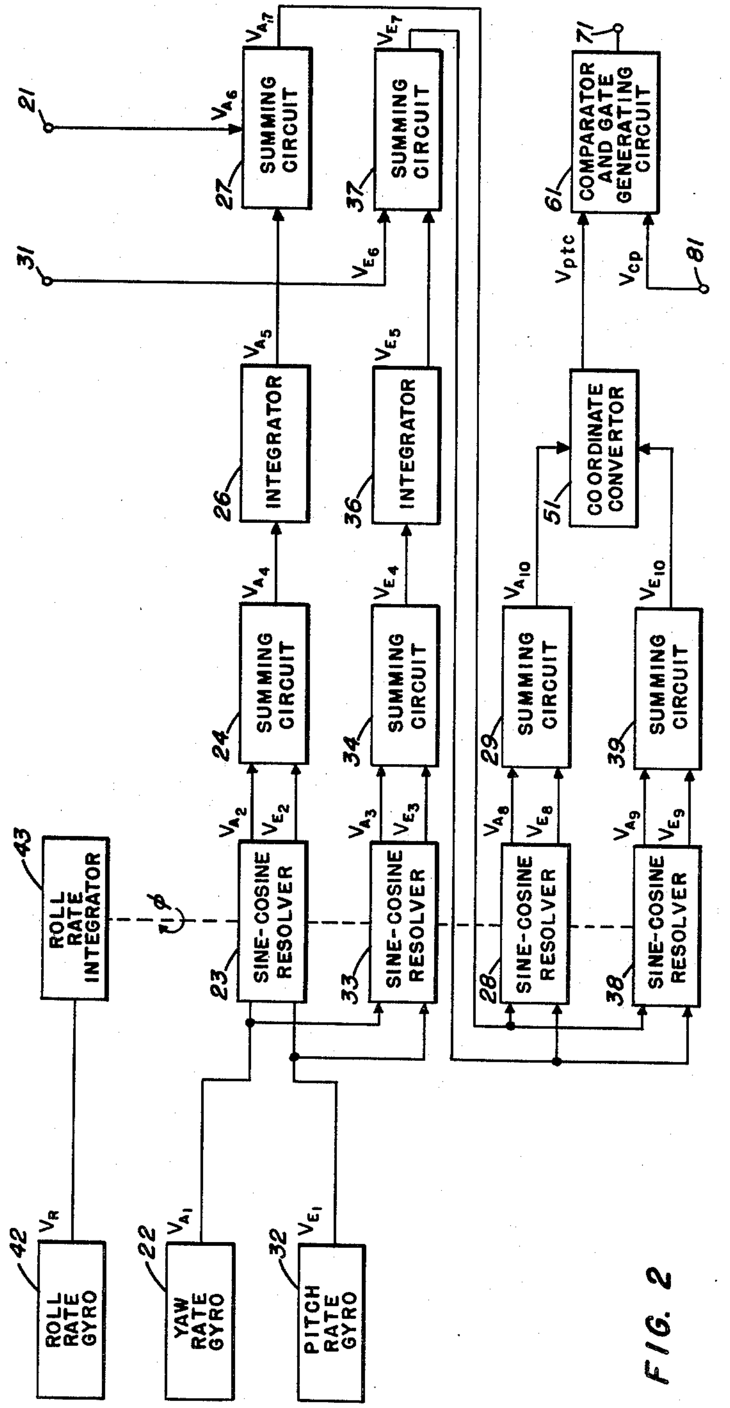

Referring now generally to FIGS. 2 and 3; FIG. 2 shows an illustrative embodiment of the invention in block diagram form, while FIG. 3, for convenience and clarity, lists in tabular form and identifies the character of each of the signals from the various components shown in FIG. 2.

Input signals from an appropriate portion of the search-while-track radar system (not shown) that are respectively proportional to the target azimuth and elevation co-ordinates at a previous target observation are applied to input terminals 21, 31. Signals proportional to the ownship yaw rate, pitch rate, and roll rate are supplied respectively from suitable rate sensing mechanisms 22, 32, 42 which may, for example, comprise rate gyros. An output signal proportional to the instantaneously correct target azimuth and elevation co-ordinates is applied to output terminal 71. As mentioned above, the output signal may be utilized to gate the ownship radar receiver to begin a target observation.

Referring now more particularly to FIG. 2, yaw rate gyro 22, as mentioned above, provides a signal $V_{A_1}$, proportional to the ownship yaw rate. The signal $V_{A1}$ is coupled to a sine-cosine resolver 23 to which is also coupled the voltage $V_{E_1}$, a signal from the pitch rate gyro 32 proportional to ownship pitch rate. An additional input to the resolver is the angle $\phi$. To generate $\phi$, which is introduced into the resolver as a shaft position, the ownship roll rate, $\dot{\phi}$, from roll rate gyro 42 may be integrated in an electro-mechanical integrator 43 which supplies a shaft position as an output. One alternative to this mechanization is the use of a position servomechanism to follow the electrical signal output of an electronic integrator.

The resolver 23 resolves the instantaneous ownship yaw and pitch rates into components of these rates which are in the azimuth direction of the initial co-ordinate system orientation. Resolver 23 provides output voltages $V_{A_2}$ and $V_{E_2}$.

In a similar way, a second sine-cosine resolver 33 resolves the instantaneous ownship yaw and pitch rates into components in the elevation direction of the initial co-ordinate system orientation. Resolver 33 provides output voltages $V_{A3}$ and $V_{E3}$.

Summing circuit 24 receives input voltages $V_{A_2}$ and $V_{E_2}$ and supplies an output voltage $V_{A_4}$, the difference between these voltages. The difference voltage $V_{A_4}$ represents a component of the instantaneous rate of change of the target position with respect to the scanning pattern as a result of ownship motion. Because the voltage $V_{A_4}$ is the difference between two voltages which represent rates in the azimuth direction of the co-ordinate system, it is representative of a rate component in this same direction. Similarly, summing circuit 34 receives input voltages $V_{A_3}$ and $V_{E_3}$ and provides an output voltage $V_{E_4}$, the sum of these voltages. The voltage $V_{E_4}$ therefore represents a rate component in the elevation direction of the co-ordinate system. Thus, the two voltages $V_{A_4}$ and $V_{E_4}$ are proportional to the time rates of change of target position in the azimuth and elevation directions, respectively, of the co-ordinate system.

Following the summing circuits are integrators which may be electronic integrating circuits. Integrator 26 produces the time integral of $V_{A_4}$ and, consequently, supplies an output voltage $V_{A_5}$ proportional to the change in the target azimuth position with reference to the aforementioned co-ordinate system over the time interval of integration. By the same process integrator 36 produces an output voltage $V_{E_5}$ which is proportional to the change in target elevation position over the time interval.

Summing circuits 27 and 37 combine voltages proportional to the initial target co-ordinates, that is, the target co-ordinates at the previous target observation, with voltages proportional to the accumulated changes in the target co-ordinates over the given time interval to produce voltages proportional to the instantaneous target co-ordinates in the co-ordinate system. Specifically, summing circuit 27 adds $V_{A_6}$, which is proportional to $\theta_{A_1}$, to $V_{A_5}$, a voltage proportional to the change in the target azimuth position co-ordinate, as stated above, to provide output voltage $V_{A_7}$; and summing circuit 37 produces output voltage $V_{E_7}$ proportional to the difference between $V_{E_6}$, proportional to $\theta_{E_1}$, and $V_{E_5}$, a voltage proportional to the change in the target elevation position co-ordinate.

The voltage $V_{A_7}$ is resolved into signals $V_{A_8}$ and $V_{A_9}$ proportional, respectively, to the components of target position in the azimuth and elevation direction of a co-ordinate system having an orientation $\phi$ with respect to the initial orientation of the scanner axes by resolvers 28 and 38.

In a similar way voltage $V_{E_7}$ is resolved by resolvers 28 and 38 into component signals $V_{E_8}$, $V_{E_9}$.

To achieve the desired instantaneous target position co-ordinates in the system with orientation $\phi$, the orientation of the scanner co-ordinate system at any instant after the previous target observation, the voltages $V_{A_8}$ and $V_{E_8}$ at the output of resolver 28 are added in summing circuit 29 to produce voltage $V_{A_{10}}$, which is proportional to the instantaneous target azimuth position $\theta_A$. In similar manner voltages $V_{A_9}$ and $V_{E_9}$ are combined in summing circuit 39 to produce voltage $V_{E_{10}}$ which is proportional to the instantaneous target elevation position $\theta_E$.

Before proceeding further with the discussion of the illustrative embodiment, reference will be made to FIG. 4 for an explanation of a quantity, termed a pattern time co-ordinate, utilized in the present invention to determine the time of occurrence of a radar receiver gating pulse. As will appear more fully below the character of the pattern time co-ordinate is determined by the geometry of the scan pattern.

Figure 4:
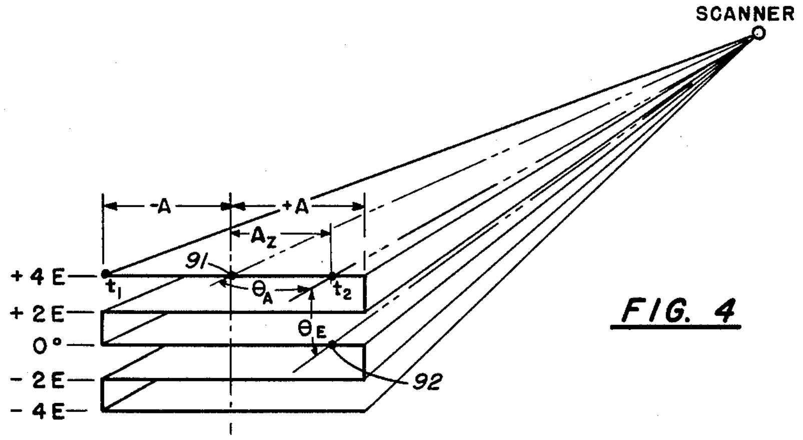
FIG. 4 is a representation of a radar scanner search pattern utilized to explain the relationship between the corrected target co-ordinate signals and the radar receiver gating pulse.

As may be seen by examining FIG. 4, the radar scanner (shown symbolically) traverses a regular pattern during each search cycle beginning at time $t_1$. The scan pattern shown is intended to be illustrative only since many other scan patterns may be used, e.g., conical. Further, of course, while FIG. 4 illustrates a squared off scan pattern the scan extremities may obviously be of a more sinusoidal nature. This is particularly true where the scanner is electrically driven.

In any cyclic search pattern any position, such as $t_2$, in the pattern can be specified by the time required to reach this position from the outset of the scan of any particular frame. The purpose of the co-ordinate converter 51 is, therefore, the specification of a position within the frame in terms of one co-ordinate, the time pattern co-ordinate, which is the time taken in one frame to the position. Since $t_2$ of FIG. 4 is the time at which the radar scanner is pointed to an azimuth angle $\theta_A$, the angle formed by point 91, the scanner and point $t_2$, and an elevation angle $\theta_E$, the angle formed by point $t_2$, the scanner and point 92, it is the time quantity corresponding to the concurrent angular quantities $\theta_A$ and $\theta_E$. Thus $t_2$ is the pattern time co-ordinate for that position described by the angular quantities $\theta_A$ and $\theta_E$.

Figure 5:
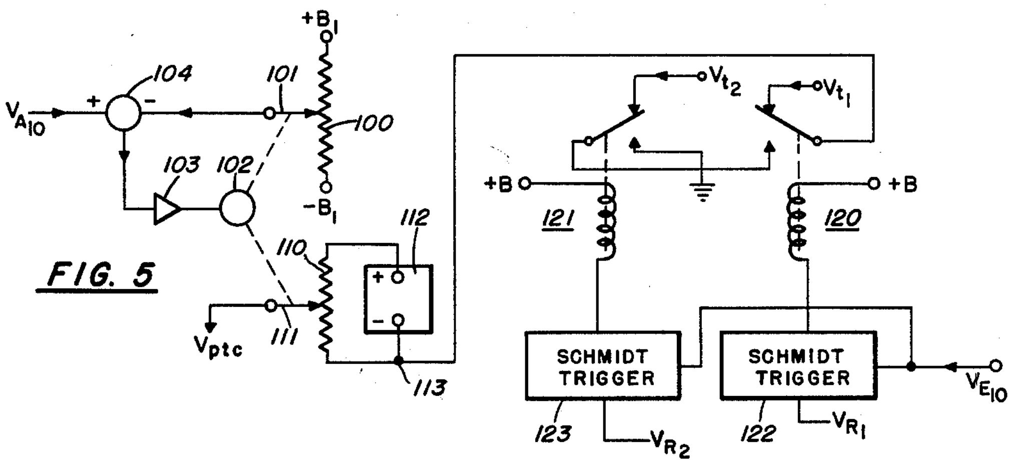
FIG. 5 is an electrical diagram of the co-ordinate converter of the invention.

The scan pattern is required only to be repetitive according to some set of functions which can be represented either by equations or tabulated values. To describe further, however, the operation of the co-ordinate converter of FIG. 5 is may be assumed that the pattern of FIG. 4 is generated by a sinusoidal variation of azimuth according to an azimuth generating function:

$$Az=A\cos\omega t \quad (17)$$

where $Az$=azimuth co-ordinate
$A$=the constant of proportionality representing scan limits
$\omega$=azimuth scanning frequency
$t$=time from the beginning of a scan or pattern time co-ordinate and step-wise variations of elevation 4E, 2E, 0°, −2E, −4E. Thus, in the assumed search pattern of FIG. 4 the pattern time co-ordinate may be determined.

Where the elevation, in terms of elapsed scan time, is greater than 4E but less than 2E and azimuth is as expressed in Equation 17 the pattern time coordinate is determined by rewriting Equation 17 as $$t=\frac{1}{\omega}\arccos\frac{Az}{A} \quad (18)$$

In instrumenting Equation 18 to an electrical scanning system the pattern time co-ordinate $t$ is expressed as pattern time co-ordinate $V_{ptc}$ and Equation 18 may be rewritten as $$V_{ptc}=K\frac{1}{\omega}\arccos\frac{Az}{A} \quad (19)$$

where $K$=constant of proportionality in relating $V_{ptc}$ to time $t$ of Equation 18. In like manner where the elevation, again in terms of scan time, is greater than 2E but less than −2E or where it is greater than −2E but less than −4E the respective pattern time co-ordinates are determined respectively as follows:

(20) $$V_{ptc}=\frac{K}{\omega}+\frac{K}{\omega}\text{ arcos }\frac{Az}{A}$$

(21) $$V_{ptc}=\frac{2K}{\omega}+\frac{K}{\omega}\text{ arcos }\frac{Az}{A}$$

It should be noted that as elevation progresses step-wise a quantity $1/\omega$ is added to each scan to include the scan time elapsed during the previous scans.

As best seen in FIG. 5 the co-ordinate converter 51 of the invention employs a potentiometer 100 wound with an arcosine function. Arm 101 is driven by a servomotor 102 in response to voltage $V_{A10}$ fed to servoamplifier 103 through nulling point 104. In this manner motor 102 develops a shaft rotational angle which is proportional to the arcosine of the azimuth co-ordinate. Of course the azimuth co-ordinate, Az, is represented in the system by its analog, the voltage $V_{A10}$. In like manner the constant of proportionality, A, is accounted for in the system by the voltages $+\beta$, and $-\beta$, applied to the opposite extremities of potentiometer 100. Arm 111 of a linear potentiometer 110 is mechanically common through the shaft of servomotor 102 with arm 101 of the arcosine potentiometer thereby developing an analog voltage proportional to the arcosine of $Az/A$. The floating potential source 112 applies a potential to the opposite extremities of potentiometer 110 to account for the instrumentation of the constant $1/\omega$ into the system.

In order to add the proper constant voltage, proportional to 1, $1/\omega$, or $2/\omega$ as required to the proper development of a suitable pattern time co-ordinate $V_{ptc}$, voltages are applied to terminal 113 of potentiometer 110. Thus the voltage on the arm 111 of linear potentiometer 110 is proportional to the pattern time co-ordinate $V_{ptc}$.

The proper voltage to be added to terminal 113 of potentiometer 110 is selected by relays 120 and 121. The elevation co-ordinate voltage $V_{E10}$ is compared by Schmidt trigger circuits 122 and 123 to reference voltages $V_{R1}$ and $V_{R2}$ which are respectively proportional to elevations such as for example to −2E and +2E. Where $V_{E10}$ exceeds neither of the reference voltages $V_{R1}$ and $V_{R2}$, neither relay is closed and a voltage $V_{t1}$ is added to the pattern time co-ordinate. This, for example, would correspond to the case where $V_{t1}$ is proportional to $2K/\omega$ and the elevation lies between −2E and −4E. If $V_{E10}$ exceeds $V_{R1}$ the relay 120 closes adding voltage $V_{t2}$ through terminal 113 of potentiometer 110. This, for example, in turn would correspond to the case where $V_{t2}$ is proportional to $1K/\omega$ and the elevation lies between +2E and −2E. Further, where $V_{E10}$ exceeds both $V_{R1}$ and $V_{R2}$ both relays 120 and 121 close thereby adding no voltage to the pattern time co-ordinate. By example this would, of course, correspond to the situation in which the elevation lies between +4E and +2E. Of course it should be understood the 4E, 2E, −2E, and −4E correspond to plus or minus angular elevation such as for example +25°, +5°, −15°, and −25° respectively.

Figure 6:
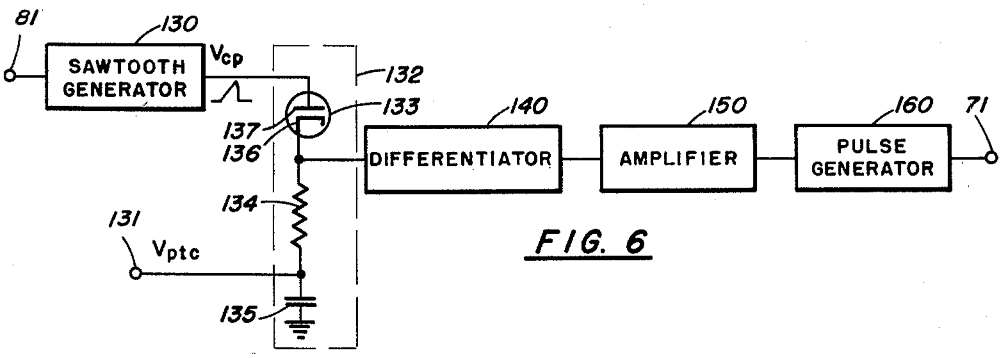
FIG. 6 is an electrical diagram of the comparator and gate generator of the invention.

The comparator and gate generating system 61 of FIG. 2 may be best understood by reference to FIG. 6. A sawtooth generator 130 generates a signal pulse $V_{cp}$ in response to an input at input terminal 81 which input is a synchronizing pulse at the start of each search cycle. The amplitude of the clock pulse $V_{cp}$ is, therefore, proportional to the elapsed time in the search cycle. A diode comparator 132 employs a diode 133, resistor 134, and capacitor 135 serially connected between sawtooth generator 130 and ground potential. The pattern time co-ordinate signal $V_{ptc}$ from input 131 is applied to the diode comparator 132 between resistor 134 and capacitor 135. In this manner the pattern time co-ordinate signal $V_{ptc}$ being applied to cathode 136 of diode 133 maintains the diode in cutoff condition until the clock signal $V_{cp}$ which is applied to the plate 137 of diode 133 exceeds this voltage ($V_{ptc}$). The point at which the clock pulse $V_{cp}$ equals the pattern time co-ordinate signal $V_{ptc}$ is that point at which the scanner has arrived at the position indicated by the time pattern co-ordinate signal $V_{ptc}$.

When $V_{cp}$ exceeds $V_{ptc}$ diode 133 begins to conduct and the conduction current through resistor 134 produces a voltage to differentiator 140. The differentiator 140 thereby reproduces the "leading" edge of this rise in voltage which is in turn amplified by amplifier 150 and employed to trigger a pulse generator 160 such as a thyratron circuit. The output 71 of pulse generator 160 is then employed for gating the radar receiver.

Obviously many modifications and variations of the present invention are possible in the light of the above teachings. It is therefore to be understood that within the scope of the appended claims the invention may be practiced otherwise than as specifically described.

What is claimed is:

1. A scanner co-ordinate compensator comprising: first signal generating means for generating signals proportional to errors in the angular co-ordinates of a target resulting from ownship maneuvers, terminal means coupled to a source of signals proportional to the initial angular co-ordinates of said target, second signal generating means coupled to said first signal generating means and to said terminal means for generating signals proportional to the instantaneously correct angular co-ordinates of said target, said second signal generating means including conversion means for converting said instantaneously correct target angular co-ordinate signals to a signal proportional to the pattern time co-ordinate form thereof, time reference signal generating means, and means including gate generating means coupled to said time reference signal generating means and said conversion means.

2. A scanner co-ordinate compensator as claimed in claim 1 wherein said conversion means comprises means for generating a signal proportional to the azimuth function of the pattern time co-ordinate and means for adding to said signal proportional to the azimuth function a signal proportional to the elevation function of the pattern time co-ordinate.

3. A scanner co-ordinate compensator as claimed in claim 2 wherein said time reference signal generator means comprises a sawtooth generator responsive to a pulse synchronous with the search of each radar search cycle thereby applying a sawtooth pulse to a comparator in cutoff condition.

4. A scanner co-ordinate compensator as claimed in claim 3 wherein said gate generating means comprises a diode comparator maintained at cutoff by the pattern time coordinate signal until said sawtooth pulse exceeds said pattern time co-ordinate signal whereupon said diode comparator provides a gate voltage for gating a radar receiver.

5. In a scanner co-ordinate compensator adapted to be mounted in an aircraft, hereinafter termed ownship: means to continuously determine the roll position of said ownship, means to determine the yaw and pitch rates of said ownship, first means coupled to said roll position determining means and to said yaw and pitch rate determining means to continuously determine the translation of said ownship with respect to one of a pair of orthogonally related reference axes, second means coupled to said roll position determining means and to said yaw and pitch rate determining means to continuously determine the translation of said ownship with respect to the other of said orthogonally related axes, means to determine the position of a target with respect to said reference axes prior to the translation of said ownship, third means coupled to said target position determining means and to said first means to continuously determine the apparent target position with respect to said one reference axis, fourth means coupled to said target position determining means and to said second means to continuously determine the apparent target position with respect to said other reference axis, fifth means coupled to said third and fourth means and to said roll position determining means to continuously determine the position of said target with respect to one of a second pair of orthogonally related axes, and sixth means coupled to said third and fourth means and to said roll position determining means to continuously determine the position of said target with respect to the other of said second pair of orthogonally related axes, said second pair of axes having an orientation with respect to said reference axes determined by the roll position of said ownship.

6. In a scanner co-ordinate compensator adapted to be mounted in an aircraft, hereinafter termed ownship, a target co-ordinate error signal generator comprising: means for generating signals proportional to ownship roll rate, means for generating signals proportional to ownship yaw rate, means for generating signals proportional to ownship pitch rate, first integrating means coupled to said roll rate signal generator, sine-cosine resolver means coupled to said first integrating means and to said yaw and pitch rate signal generating means, first summing circuit means coupled to said sine-cosine resolver means, second integrating means coupled to said first summing means, terminal means coupled to a source of signals proportional to a target co-ordinate, second summing means coupled to said terminal means and to said second integrating means, second sine-cosine resolver means coupled to said first integrating means and to said second summing means, and third summing means coupled to said second sine-cosine resolver means.

7. A scanner co-ordinate compensator adapted to be mounted in an aircraft, hereinafter termed ownship, comprising: means for generating signals proportional to ownship roll rate; means for generating signals proportional to ownship yaw rate; means for generating signals proportional to ownship pitch rate; first integrating means coupled to said roll rate signal generating means; an azimuth co-ordinate target error signal generator comprising first sine-cosine resolver means coupled to said first integrating means and to said yaw and ptich rate signal generating means, first summing means coupled to said first sine-cosine resolver means, second integrating means coupled to said first summing means, first terminal means coupled to a source of signals proportional to the azimuth co-ordinate of a target, second summing means coupled to said first terminal means and to said second integrating means, second sine-cosine resolver means coupled to said first integrating means and to said second summing means, and third summing means coupled to said second sine-cosine resolver means; an elevation co-ordinate target error signal generator comprising third sine-cosine resolver means coupled to said first integrating means and to said yaw and pitch rate signal generating means, fourth summing means coupled to said third sine-cosine resolver means, third integrating means coupled to said fourth summing means, second terminal means coupled to a source of signals proportional to the elevation co-ordinate of a target, fifth summing means coupled to said second terminal means and to said third integrating means, fourth sine-cosine resolver means coupled to said first integrating means and to said fifth summing means, and sixth summing means coupled to said fourth sine-cosine resolver means; said third and sixth summing means providing output signals proportional to the instantaneously correct target azimuth and elevation co-ordinates free of the effects of ownship motion; and means including gate generating means coupled to said third and sixth summing means.

8. A scanner co-ordinate compensator as claimed in claim 7 wherein said means including gate generating means includes conversion means coupled to said third and sixth summing means for converting the instantaneously correct target azimuth and elevation co-ordinate signals into a signal proportional to the time elapsed in the scanning cycle of a radar scanner at which time the radar scanner is oriented in accordance with said instantaneously correct target co-ordinates; time reference signal generating means; and comparator and gate generating circuit means coupled to said co-ordinate converting means and to said time reference signal generator and operable to generate a gating pulse.

9. A scanner co-ordinate compensator as claimed in claim 8 wherein said comparator and gate generator means comprise a diode comparator maintained at cutoff by said instantaneously correct target azimuth and elevation co-ordinate signals until said diode comparator is rendered conductive by a sawtooth wave generator responsive to a pulse synchronous to the start of a radar search cycle.

10. A scanner co-ordinate compensator as claimed in claim 9 wherein said conversion means comprises potentiometer means, servo means commonly connecting said potentiometer means for generating a signal proportional to the azimuth function of said instantaneously correct target azimuth co-ordinate and means for adding to said azimuth proportional signal a signal proportional to the instantaneously correct target elevation co-ordinate.

11. A scanner co-ordinate compensator as claimed in claim 10 wherein said means for adding an instantaneously correct target elevation co-ordinate signal comprises relay means responsive to means for comparing reference voltages with a signal proportional to the correct elevation co-ordinate.

References Cited by the Examiner

UNITED STATES PATENTS

| | | | |
|---|---|---|---|
| 2,996,706 | 8/61 | Newell et al. | 343—7 |
| 3,044,056 | 7/62 | Bloch | 343—7 |
| 3,078,455 | 2/63 | Brainin | 343—7 |
| 3,099,005 | 7/63 | Goldberg | 343—7 |
| 3,123,822 | 3/64 | Shelley et al. | 343—7.4 |
| 3,126,538 | 3/64 | Byerly et al. | 343—7 |
| 3,146,441 | 8/64 | Miller | 343—5 |
| 3,155,964 | 11/64 | Voles | 343—5 |

CHESTER L. JUSTUS, *Primary Examiner.*

KATHLEEN H. CLAFFY, *Examiner.*